United States Patent [19]
Margraf

[11] 3,892,543
[45] July 1, 1975

[54] METHOD OF THE REMOVAL OF CHEMICALLY ACTIVE COMPONENTS FROM DUST-LADEN GAS STREAMS

[76] Inventor: Adolf Margraf, Im Haberkamp 196, 4961 Wendthagen, Germany

[22] Filed: Oct. 9, 1973

[21] Appl. No.: 404,748

[30] Foreign Application Priority Data
May 26, 1973 Germany.............................. 2327020

[52] U.S. Cl. ........................... 55/96; 55/97; 55/262; 55/341
[51] Int. Cl. ............................................ B01d 46/04
[58] Field of Search ........... 55/97, 96, 74, 262, 302, 55/341

[56] References Cited
UNITED STATES PATENTS

| | | | |
|---|---|---|---|
| 2,875,844 | 3/1959 | Pring........................................ | 55/97 |
| 3,421,295 | 1/1969 | Swift et al............................. | 55/302 |
| 3,521,428 | 7/1970 | Dollinger et al....................... | 55/341 |
| 3,798,877 | 3/1974 | Lamb...................................... | 55/97 |

Primary Examiner—Bernard Nozick
Attorney, Agent, or Firm—Karl F. Ross; Herbert Dubno

[57] ABSTRACT

Dust-laden gas streams containing a chemically toxic or noxious component are initially passed through a first pocket filter to remove particulate matter and then may be charged with an additive capable of binding the toxic or noxious components in the form of solid particles which are entrained by the prepurified gas stream to a second pocket filter. The particulate layer containing the additive and deposited upon the latter filter surface is periodically dislodged and reentrained by the gas stream onto the filter surface until the quantity of additive which is deposited on the second filter surface is between 100 and 1,000 times the quantity per hour of the additive charged into the prepurified gas stream. Equilibrium is then maintained between collected solids on the second filter surface as additive solids are carried onto the latter so that the quantity of the additive withdrawn per hour as collected from the filter is equal to the quantity per hour of the additive charged into the prepurified gas stream.

3 Claims, 1 Drawing Figure

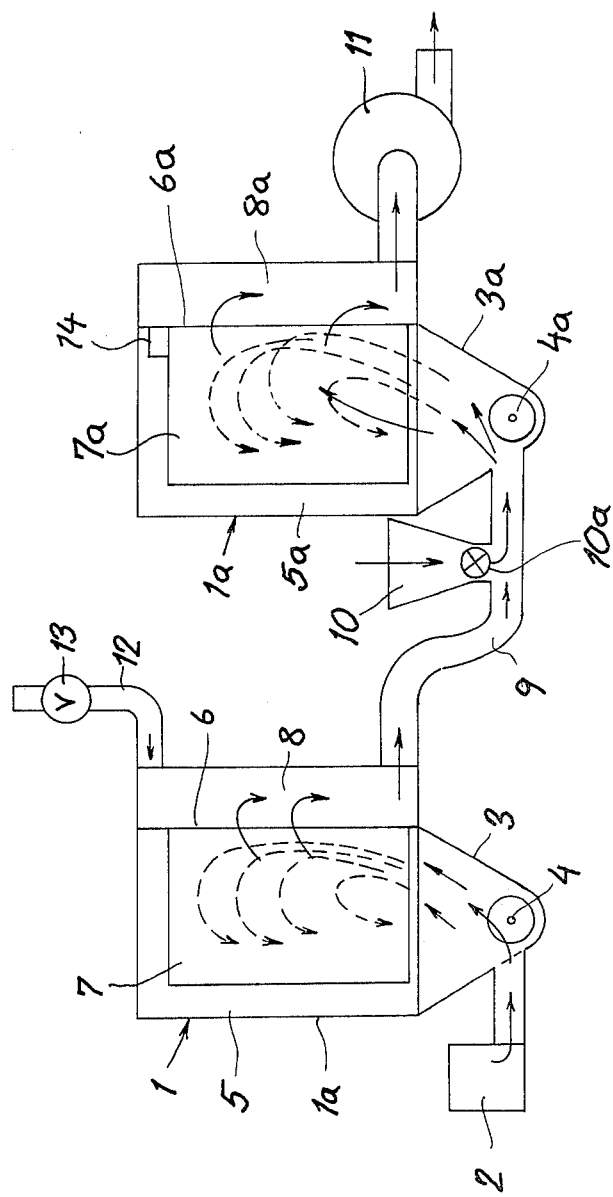

METHOD OF THE REMOVAL OF CHEMICALLY ACTIVE COMPONENTS FROM DUST-LADEN GAS STREAMS

1. CROSS-REFERENCE TO RELATED APPLICATIONS

The present application is related to my application Ser. No. 343,802 filed Mar. 22, 1973 describing a pocket filter apparatus of the type which may be used in the present system. This application is related to my earlier application, copending with the present case, bearing Ser. No. 230,721 and filed Mar. 1, 1972 now U.S. Pat. No. 3,834,123 issued Sept. 10, 1974 for a method which is most effectively carried out using the apparatus of application Ser. No. 343,802. The present application also relates to a system of the type described in application Ser. No. 343,803 filed Mar. 22, 1973 in which chemical contaminants of a toxic or noxious nature may be removed by treating them with an additive capable of binding the toxic components.

2. FIELD OF THE INVENTION

The present invention relates to a method of and an apparatus for the treatment of gases containing chemically active contaminants, e.g. chemically toxic, noxious or corrosive components, in addition to particulate matter such as dust, and to a system or apparatus for carrying out this method.

More particularly, the invention relates to improvements in the system set forth in the aforementioned copending applications and especially in systems for the purification of dust-laden chemical-plant, industrial and metallurgical waste gases.

3. BACKGROUND OF THE INVENTION

In the treatment of waste gases containing particulate matter and chemically active contaminants, e.g. sulfur oxides or halogen compounds which form acids in the presence of moisture. A variety of systems have been proposed which have been found to be more or less effective. As effectiveness increases, however, most systems are characterized by a concommittent decrease in throughput and increase in cost.

In the aforementioned copending applications, I have pointed out that pocket, bag or tube filters have proved to be especially effective for the treatment of dust-laden and chemically contaminated gas streams, especially when certain techniques with respect to the development of a layer upon the filter surface are employed. For example, in one of these applications I have pointed out that additives reactive with the chemical contaminant may be charged into a gas stream and the chemical contaminant thereby bound into solid particles which can be trapped in the pocket filter. However, the additives are not always capable of reacting completely with the chemical contaminants before they contact the filter so that, whenever the filter is cleaned as has been deemed essential for continued efficiency, a portion of the chemically contaminated gas may yet escape into the atmosphere. To avoid this problem, one may add larger quantities of additive but this inordinately increases the cost and even the technique described in my aforementioned application whereby particle-containing gases are recirculated or particles from the filter are recirculated to the filter surface until the deposit thereon reaches from 2 to 100 times the quantity charged into the gas stream per unit time, is not fully effective.

The problem has been found to be particularly acute for the recovery of chemical contaminants such as sulfur dioxide or contaminating aerosols from exhaust, chimney, furnace or other dust-laden waste gas and when the additive is designed for adsorption or absorption or chemical reaction with the chemical contaminant to bind the latter in solid particles. It has been found that, while a high particulate concentration is desirable for the buildup of the filter layer for most efficient operation, the presence of particles in the gas stream containing the additive is and creates a significant problem. The additive becomes ineffective in the conventional system prematurely with a concommittent decrease in efficiency and increase in cost.

4. OBJECTS OF THE INVENTION

It is the principal object of the present invention to provide an improved method of treating chemically contaminated particulate-laden gas streams, especially furnace waste gases containing contaminant gases (such as sulfur dioxide), aerosol particles and the like, whereby the disadvantages of earlier systems are obviated.

Another object of the invention is to provide an improved apparatus or system for the treatment of such gases.

5. SUMMARY OF THE INVENTION

These objects and others which will become more readily apparent hereinafter are attained in a process for the filtering of chemically toxic, noxious or corrosive gases or contaminating aerosols from dust-laden furnace-exhaust or like gases using a pocket filter or tube filter and in which the prepurified gas emerging from a pocket or tube filter is fed to a second pocket or tube filter and in dependence upon the throughput, a predetermined quantity per hour of additive is supplied to the gas stream fed to the second pocket or tube filter. The additive, according to the invention, is capable of binding the injurious gas or aerosol into solid particles by adsorption, by absorption and/or by chemical reaction to form the solid particles. The particles containing the additive and noxious impurity gas or aerosol are collected upon the filter surface of the second pocket or tube filter and are, according to an improtant feature of the invention, periodically dislodged and reintroduced into the gas stream passing through the filter until the quantity of additive in the filter reaches 100 to 1,000 times the quantity per hour of the additive charged into the gas stream. At this level of buildup of the filter layer, an equilibrium or steady state is established, according to the invention, whereby the quantity of additive containing particles withdrawn upon descent from the pocket or bag or tube filter is equal to the hourly quantity of additive charged into the gas stream.

When reference is made here to a pocket, tube or bag filter, I intend thereby to identify all of the filters generically describable as pocket filters and wherein a gas stream entrains particulate matter into a downwardly open space bounded by a vertical filter wall formed from filter cloth or other flexible material and confined in a cage or other gas-permeable wall structure. Nonadhering particulate matter can descend through the lower opening and can be removed by a collecting funnel and worm or other conveyor device at the base of the pocket filter. The gases pass laterally through the walls of the filter material.

The term "equilibrium" as used earlier is intended to describe a steady-state operation of the filter whereby, under the operating conditions particles fall from the walls or filter surfaces of the filter and are collected at the bottom thereof at a rate equal to that at which particles are carried by the incoming gas stream on to the filter layer as the gases pass through the filter layer and filter surface. Under these circumstances, the quantity of additive removed in the form of collected particles in the mouth of the pocket filter will be equal to the quantity of additive charged into the prepurified gas stream which acts as a carrier for the most effective (fresh) additive onto the filter surface, the surplus additive settling from the filter and again contacting the gas stream before being removed from the filter.

The system of the present inventions thus provides two pocket or tube filters in tandem in which the first functions to remove the solids normally present in the smoke or waste gas (exhaust gas) stream while the second only receives prepurified gas from the first filter and operates as part of the system for binding the noxious gas or aerosol into collectable solids. The initial recirculation of the particles and additives in the gas stream to build up a quantity of 100 to 1,000 times the regular charge rate of the additive in the filter provides a considerable surplus of the additive which has been found to increase the reaction with the noxious material during the subsequent operation. The periodic release of the material from the filter surface and its recirculation to the gas stream traversing the filter practically precludes passage of noxious material through the filter while the continued descent of material from the filter surface and entrainment of the material onto the latter provides a continuous circulation of particles which further increases the efficiency of reaction between the noxious components and the additive.

In the first filter, exhaust gases containing 1 to 2 grams per standard cubic meter of dust particles can be so treated as to remove all but 10 to 20 mg per standard cubic meter of solid particles. In this system, the dust collected can be recirculated in the first filter as described in the aforementioned copending applications until the recirculating quantity of dust is 2 to 100 times the quantity of dust entrained by the incoming gas stream into the filter per unit time.

In the process of the present invention, the residence time of the overwhelming majority of the additive in the second filter is dependent upon the aforementioned ratio of 1:100 to 1:1000 so that, for example, with a steady state condition of the mass in the second filter in a ratio of 1:100, a mean residence time of 100 hours is ensured. Since the additive is supplied to the gas stream at a constant rate, therefore, the additive and particulate mass is recirculated within the second filter and retained therein without removal of particulate material from the second filter until the quantity of additive in the second filter reaches 100 to 1,000 times the hourly quantity of additive metered into the gas stream.

When this quantity of additive in the filter is to be 100 times the hourly addition to the gas stream, the lower limit of the operating range of the present invention, this buildup requires 100 hours whereas 1,000 hours is required for the buildup of the additive and particulates when the quantity of additive in the second filter is to be 1,000 times the hourly addition quantity of the additive to the gas stream.

In order to reach the steady-state condition more rapidly, however, it is possible to initially increase the quantity of additive above that of the steady-state condition and, upon achieving the desired equilibrium or steady-state quantity in the second filter, to reduce the additive input to the gas stream to the normal hourly rate calculated for removal of all of the contaminants. In either case, the incoming gas stream and its normal additive concentration see a quantity of additive accumulated in the second filter which is 100 to 1,000 times the hourly addition rate and hence the statistically average quantity of additive traversing the second filter will have a residence time in accordance with the aforementioned ratio of 1:100 to 1:1000.

The relationship between noxious gases or aerosols on the one hand and the quantity of additive to which the gas is exposed on the other hand is of a sufficient level to insure practically complete binding of the noxious component in, on, or by the additive and will correspond to the hourly rate of feed of the additive. In other words, the quantity of additive which is charged into the gas stream will be that which is required to tie up all of the noxious components therein in spite of the fact that this quantity whould not normally be effective to this extent merely upon contact with the noxious components in the gas stream. The quantity of additive removed from the second filter is likewise depleted in the sense that all of its ability to tie up the noxious component has been utilized. The quantity of particulates removed from the second filter hourly, after steady state has been achieved, thus contains an amount of the noxious component equal to that brought into the second filter by the gas stream over the same period of time.

It has been found to be possible, using the present techniques, to introduce chemical additives such as oxides or hydroxides of alkali metal, alkaline earth metals or aluminum to tie up chlorine, fluorine and chlorofluoro compounds as well as sulfur compounds, in solid particulate materials which may be process further if desired. The system is particularly advantageous in the filtering of furnace, metallurgical and chemical plant exhaust gases containing particulates in addition to such noxious components.

The additive may be charged into the gas stream as pulverulent solids or as suspensions in a carrier liquid, in which case the gas stream contacting the suspension in or ahead of the second filter must be at a temperature sufficiently high to vaporize the carrier liquid.

When desirable, e.g. to increase the humidity or moisture content of the gases emerging from the filter and/or to promote chemical reaction therein, water vapor may be added to the gas stream in the gaseous state or in the form of liquid water which is vaporized in the second filter.

Since the particulates recovered from the second filter are free from the particles normally present in the waste gas initially and consist of the noxious component combined with the additive, the additive may be regenerated with ease, e.g. by heating, for reuse in the filtering process.

6. DESCRIPTION OF THE DRAWING

The above and other objects, features and advantages of the present invention will become more readily apparent from the following description, reference being made to the accompanying drawing in which the sole FIGURE is a diagram illustrating an apparatus according to the present invention.

7. SPECIFIC DESCRIPTION

In the drawing, I show a first pocket, bag or tube filter 1, e.g. of the type described in the aforementioned copending applications, which comprises an outer housing 1a, a downwardly open filter bag 7 held in an appropriate frame, and a perforated, slotted or apertured wall 6 through which the gases emerge from the filter bag. The space 5 within the housing 1 is supplied with dust-laden gas containing a noxious gaseous or aerosol component from an upwardly open funnel communicating at its lower end with a duct 2 connected to an industrial, chemical, metallurgical or like waste gas source. A worm 4 at the bottom of the hopper serves to remove particulates which are dislodged from the filter pocket 7.

The dust-containing contaminated waste gas is fed from the duct system 2 through the hopper 3 and through the filter 7, the purified gas passing into a clean gas compartment 8 from which it is led by a duct 9. A sparging gas can be flushed through the compartment 8, the filter 7, the space 5 etc. by a duct 12 controlled by a valve 13 to dislodge the dust from the filter surface and clean the filter periodically, the particulates accumulating in the hopper 3 being led off by the conveyor 4.

As described in the aforementioned application, periodically during the filter operation, the dust is dislodged from the filter 7 (e.g. by the back-flushing gas) so that it is reentrained by the waste gas as represented by broken lines in the drawing and is carried again onto the filter surface in particles of increased size. Thus, within the first filter as well a steady-state relationship is established in which a large residual quantity of dust is continuously recirculated in the incoming gas stream to build up particles of large size (agglomerates) which are easily filtered and led away by the conveyor. Instead of a pocket filter, it is also possible to make use of bag filters as have been described previously and to carry out the initial filtering stage with recirculation, although such recirculation as fully described in the prior applications is not always necessary when the incoming gas stream has a low-solids content or when the solids content is in the form of large-size particles.

The prepurified gas stream, free from particles but still containing the noxious component, is carried by duct 9 into a second filter housing 1a having a pocket filter 7a, a contaminated-gas plenum 5a, a slotted wall 6a, a clean-gas compartment 8a, a funnel-type feeder 3a and a conveyor 4a all as described for the first filter. Upstream of the second filter there is provided a hopper 10 with a metering device 10a through which solid additives can be charged into the gas stream.

The gas stream carrying the additive which is capable of binding the noxious component passes into the filter and the resulting particles collect upon the filter surface. Periodically the particles are dislodged and carried again by the gas stream onto the filter surface, e.g. by jogging the filter via a jogger 14 or by backflow of a gas stream as described for the first filter, until the quantity of additive in the second filter is 100 to 1,000 times the quantity of additive charged hourly into the gas stream. The gases emerge into the clean-gas chamber 8a and are evacuated by the blower 11 as shown by the solid line arrows and the recirculation of the additive-containing particulates in the second filter is represented by broken lines. When steady state is reached at this level of accumulation of the additive, a quantity of the additive-containing bound contaminants is removed by the worm 4a which is equal to the quantity of additives carried onto the filter by the gas stream in a given unit of time (say 1 hour), this surplus additive falling into the hopper 3a since it can no longer be entrained in the gas stream or retained by the filter surface.

8. SPECIFIC EXAMPLE

A furnace waste gas at a temperature of 500°C, containing 1.5 g/m$^3$ (STP) of particles in the particle size range of the order of microns and traces of sulfur dioxide is passed at a rate of 100,000m$^3$/hour (STP) through the first filter 1 after the latter has been saturated with dust particles recirculating in an amount of about 50 times the hourly dust input. The gas stream emerging into the second filter at substantially the same rate contains about 15 mg/m$^3$ (STP) of particles. About 10 kg/hour of activated carbon is charged into the gas stream at 10 and the filter 1a is operated with release of the collected particles until approximately 500 kg of the additive has accumulated. The gas stream emerging from the filter is found to be free from sulfur dioxide and particulates and 10 kg/hour of activated carbon containing adsorbed sulfur dioxide is recovered. The activated carbon is regenerated by heating and returned to the hopper 10. The process was also carried out with chlorine, fluorine, chlorofluoromethanes, hydrogen fluoride and hydrogen chloride as contaminants. Aluminum oxide, magnesium oxide, calcium hydroxide and potassium hydroxide were used as additives with similar results. Aluminum oxide was also introduced in suspension in water (which vaporized) and was found to be effective especially with fluorine and chlorine-containing contaminants. Variation of the quantity of additive in the second filter showed effective results between 1,000 and 10,000 kg of the additive.

I claim:

1. A process for removing substances from a particle-containing gas stream having a noxious component capable of interaction with and retention by a particulate-solid additive, said process comprising the steps of:
   a. passing the particle-containing gas stream through a first pocket filter to remove the particles therefrom and produce a prepurified gas;
   b. feeding into and admixing with the prepurified gas emerging from said first filter and freed from said particles a predetermined quantity per hour of said particle-solid additive capable of binding said component in the form of solid particles of the additive and said component;
   c. passing the prepurified gas admixture with said additive through another pocket filter to trap said particles of additive and said component upon a surface thereof;
   d. periodically dislodging said solid particles of additive and said component from said surface and reentraining them with the prepurified gas onto said surface until the quantity of the additive on said surface is 100 to 1,000 times greater than said predetermined quantity, said prepurified gas thereafter passing through the layer thus formed on said surface; and e. maintaining the steady state of said layer by removing particles of additive and said component from the surface as recited in step (d) and from the gas stream at substantially the hourly rate that said additive is supplied to said layer by said prepurified gas.

2. The process defined in claim 1 wherein said additive is finely divided active carbon, or an oxide or hydroxide of an alkali metal, an alkali earth metal or alumina.

3. The process defined in claim 1 wherein said additive is charged into said prepurified gas stream in a liquid carrier vaporizable at the temperature of said prepurified gas.

* * * * *